Oct. 25, 1938.  E. KIPPHAN  2,134,131
ELECTRIC RECTIFIER
Filed Nov. 14, 1936
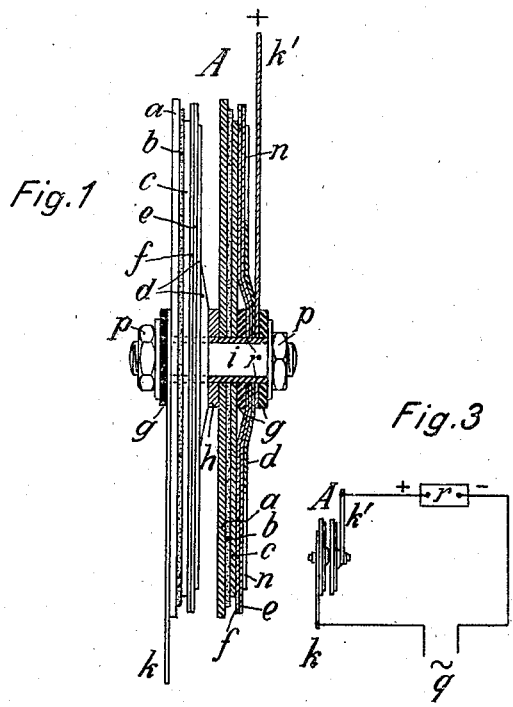
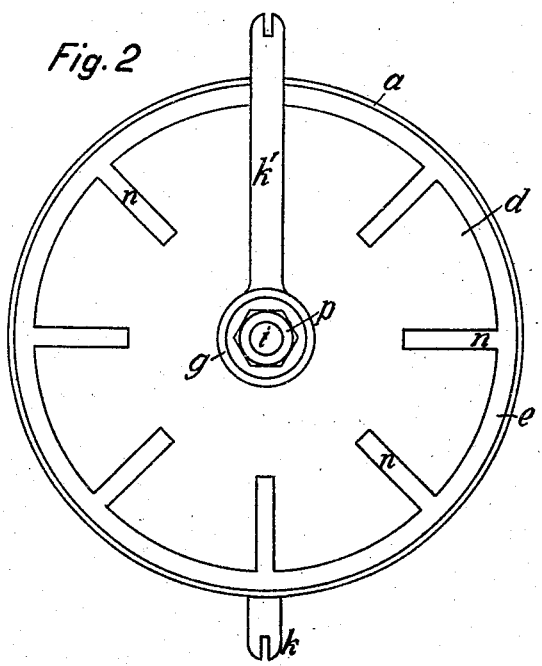
Inventor:
Erich Kipphan
by R.C. Hopgood
Attorney Patented Oct. 25, 1938

2,134,131

UNITED STATES PATENT OFFICE 2,134,131

ELECTRIC RECTIFIER

Erich Kipphan, Nuremberg, Germany, assignor to Suddentsche Apparate-Fabrik G. m. b. H., Nuremberg, Germany, a company Application November 14, 1936, Serial No. 110,813
In Germany December 3, 1935

5 Claims. (Cl. 175—366)

Among the devices for producing a continuous current from an alternating current there are the so-called dry rectifiers which are composed of rectifying valve plates and a contact plate allotted to each of these.

The invention relates to rectifiers of this kind and more particularly to dry rectifiers which are lacquered in order to protect them from moisture and thus to adapt them for use in tropical regions, for instance. The lacquer coating thereon may be produced in a well-known manner by dipping the rectifiers into the lacquer, the lacquer here employed being preferably of a special nature particularly suitable for this purpose.

The invention has for its object to overcome a drawback that has been experienced in connection with the provision of a lacquer coating. This drawback and an example of the novel arrangement are described hereinafter with reference to the accompanying drawing in which Fig. 1 is a partially sectioned elevation of a rectifier as provided by the invention, Fig. 2 is an end view to Fig. 1, and Fig. 3 is a wiring diagram of the rectifier shown in Figs. 1 and 2. For the sake of a clear representation the plates and layers thereof are shown larger in thickness than they really are.

The rectifier A represented by way of example comprises two rectifying valve plates, each consisting in a well-known manner of a metal disc $a$, a semi-conductive layer $b$ which is the rectifying means, and a metallic layer $c$. Layer $c$ may be applied to layer $b$ by die-casting. To each plate $a$, $b$, $c$ a disc $d$ is allotted which has radial slots or incisions $n$ extending from the circumference thereof, the discs $d$ thus being elastic. Disposed between each layer $c$ and disc $d$ are two supple metal foils $e$, $f$ made of aluminium, for instance, and by preference punched conjointly in order to be held together by the circumferential ridge formed in this way. $h$ denotes a metal piece while $g$ designates insulating pieces. Parts $a$, $b$, $c$, $d$, $e$, $f$, $g$, $h$ are mounted on an insulating sleeve $o$ encompassing a bolt $i$ and are confined thereon by nuts $p$ screwed onto bolt $i$. By $k$, $k'$ the two soldering taps are denoted, the rectifier represented by way of example being of the kind requiring only two such taps.

In Fig. 3, $q$ denotes an alternating current source whose energy is by rectifier A converted into a continuous current delivered to a current consuming device $r$.

In prior devices the metal foils $e$, $f$ are missing, parts $c$, $d$ thus contacting with each other. There will be therefore narrow fissures between the edge portions of these parts. As a result, on dipping the rectifier into the lacquer this may happen to enter such fissures and then to harden there. Plate $a$, $b$, $c$ and disc $d$ are hereby rigidly connected with each other. These two parts, however, tend to move with respect to each other under the influence of mechanical stresses caused in the rectifier by the temperature variations which occur on connecting the rectifier and then again on disconnecting it. Since they can not obey such stresses if held together by the hardened lacquer, the layer $c$ consisting of soft metal may happen to be split off somewhere, and layer $b$ may likewise by injured thereby. As a result, the return current will increase in accordance with the connecting and disconnecting of the rectifier which therefore will puncture finally.

The foils $e$, $f$, however, are so intimately contacting with each other that it is impossible for the lacquer to enter between them, and they will thus always be free to slide on each other under the influence of stresses of the said nature. Lacquer will only be able to enter between the parts $c$ and $f$, or $d$ and $e$, and thus cause foils $f$, $e$ to stick to $c$ and $d$. This however is advantageous inasmuch as parts $c$, $d$ hereby act to stiffen the foils and thus aid the foils whenever these are to slide on each other.

The foils $e$, $f$ are preferably larger than the discs $d$, and more than two such foils may be disposed if this be advantageous for any reason.

While the device represented by way of example comprises two rectifier elements $a$, $b$, $c$, $d$, $e$, $f$, it is to be understood of course that rectifiers as provided by the invention may be composed of any number of such elements and may also comprise one element only, and it is further to be understood that rectifiers embodying the described improvement may be included in any circuit arrangement other than that shown in Fig. 3.

What is claimed is:

1. A dry rectifier element comprising a rectifying valve plate, a contact plate therefor, two supple metal foils between the said plates, said foils being in close physical contact with one another, and a lacquer coating over the entire outer surface of the rectifier element, the mutually contacting surfaces of said foils being free from lacquer.

2. A dry rectifier element comprising a rectifying valve plate, a contact plate therefor, a plurality of metal foils between said plates, and a coating of lacquer covering the plate-foil aggregate, said foils being in such intimate contact with each other as to prevent the entrance of said lacquer during the subsequent coating process whereby said lacquer can be readily applied without impairing the freedom of motion of said contact plate with respect to said valve plate.

3. A rectifier according to claim 1 wherein the metal foils are of aluminum whereby an intimate contact between said foils is secured while a free sliding action is maintained.

4. The method of manufacturing a waterproofed rectifying stack having a rectifying plate and a contact plate which comprises, interposing between said plates, a plurality of layers of foil, clamping said plates and foil into a stack so as to bring two surfaces of said foil into intimate liquid-tight contact, and dipping said stack into a solution of lacquer whereby said stack is completely waterproofed while still maintaining the freedom of motion between its plates.

5. A dry rectifier element according to claim 1, and in which said two metal foils are held together by a circumferential ridge formed when these foils are punched conjointly.

ERICH KIPPHAN.